Jan. 26, 1943. J. SUNNEN 2,309,615
CRANK SHAFT GRINDER
Original Filed May 22, 1939 6 Sheets-Sheet 1

INVENTOR
JOSEPH SUNNEN
ATTORNEY

INVENTOR
JOSEPH SUNNEN
ATTORNEY

INVENTOR
JOSEPH SUNNEN
George R. Ericson
ATTORNEY

Jan. 26, 1943   J. SUNNEN   2,309,615
CRANK SHAFT GRINDER
Original Filed May 22, 1939   6 Sheets-Sheet 4

INVENTOR
JOSEPH SUNNEN
ATTORNEY

Patented Jan. 26, 1943

2,309,615

UNITED STATES PATENT OFFICE 2,309,615

CRANKSHAFT GRINDER

Joseph Sunnen, Clayton, Mo., assignor to Cornelia Sunnen, Clayton, Mo.

Original application May 22, 1939, Serial No. 275,092. Divided and this application December 29, 1939, Serial No. 311,669

16 Claims. (Cl. 51—55)

This invention relates to devices for grinding cylindrical surfaces, and it is especially intended and adapted for the grinding of eccentrically mounted cylindrical surfaces such as the crank shaft bearings of an automobile. The device is constructed and arranged, however, so as to be capable of grinding the concentric main bearings as well as eccentric crank bearings.

This device is particularly intended for use by repair shops in regrinding worn crank shafts as distinguished from the original factory grinding of the crank bearings. For this reason, it is necessary to have a light, simple, and preferably portable device.

Automobile crank shafts of the type generally in use are not provided with any convenient means for lining up a grinder to grind the cranks true to an axis which is parallel to the main axis of the crank shaft, and, for this reason, it is necessary to provide a separate means for maintaining parallelism between the axis of the crank which is being ground and the main axis of the crank shaft. I accomplish this in either of two ways: First, if the crank shaft is to be ground without removing it from the crank case of the engine, I attach a guide rod or guide frame to the engine base, using the crank case bolt holes as a means of attachment, and, second, if the crank shaft has been disassembled from the engine, it is mounted between centers in an engine lathe or similar device. Both of these arrangements involve the necessity of rotating the crank shaft while grinding the crank bearings, and the provision of means whereby the grinder may follow the crank in its rotation.

When the crank bearings are to be ground without removing the crank shaft from the engine, I mount the guide frame and shaft on the engine base in parallelism with the main axis of the crank shaft. A counter shaft is pivotally connected to the guide shaft so as to keep it parallel therewith while permitting it to swing in the arc of a circle about the guide shaft. I pivotally connect to the guide shaft a motor carrying arm which is provided at its free end with pivot means also parallel to the main axis of the crank shaft. The grinder and its driving motor are mounted on this pivot means. At the end of the motor frame, I attach a guide arm terminating in a hook which hangs on the surface of the crank which is to be ground, the weight of the motor grinder being used to maintain the hook in engagement with the crank during its rotation. The cutting surface of the grinding wheel is adjustably mounted adjacent the cylindrical surface of the crank which is to be ground at a point opposed from the points of contact between the hook and the bearing surface.

When the crank shaft is disassembled it is mounted between centers as in a lathe, and may be ground in substantially the same way as when the crank shaft is in the car, but it is necessary to provide a counterweight to overcome the weight of the grinder and hold the hook firmly against the lower part of the crank. The weight is mounted at one end of the walking beam which is pivoted to a frame or guide therefor. This guide shaft is mounted on the lathe by means of a frame similar to the guide shaft and frame used when grinding the crank bearings while the crank shaft is mounted on the engine. The chief difference is that the weight of the grinder must be overcome so that the hook will be firmly held in contact with the crank, and this is accomplished by means of the counterweight.

When the main bearings of the crank shaft are to be ground, the crank shaft is essentially completely disassembled from the engine and placed between centers in a lathe or similar device. In this way, perfect alignment of the main bearings can be maintained, but in order to insure such alignment, it is desirable to locate the grinding wheel with respect to the centers in the ends of the crank shaft rather than to attempt to guide the wheel from the opposite side of the bearing which is being ground. For this reason, I disconnect the hook or guide from the guide arm and attach the arm to a fixture on the cross slide of the lathe or to any other convenient part thereof. By this arrangement, the rocking action of the motor with respect to the guide arm is retained, but the motor is otherwise stationary with respect to the center of the crank shaft.

Where the crank bearings are to be ground without removing the crank shaft from the engine, it is necessary for the grinding wheel to follow the crank while it is rotated in the crankcase. The space for this operation is limited, and it is therefore necessary to provide a grinding wheel of small size which may be projected up into the crankcase between the crank cheeks as it follows the crank bearing in its rotation.

For the reasons above indicated, I use a comparatively small grinding wheel, the diameter of which may be approximately the same as the length of the bearing which is to be ground. The wheel is preferably of the "cup" type, the grinding surface being on the radial face or end of the wheel and not on its cylindrical outer surface.

Because of the grinding wheel size and structure it is, therefore, necessary not only to rotate the crank shaft and operate the grinder motor to accomplish the grinding, but it is also necessary to sweep the face of the grinder tangentially across the surface of the shaft, the axis of the grinder swinging in a plane perpendicular to the axis of the crank. It is also necessary, during this swinging action, to maintain the correct relationship between the cutting surface of the grinder and the axis of the crank. For instance, if the distance between the plane of the circular cutting surface and the axis of the crank is one inch when axis of the grinding wheel is in a position to intersect the axis of the crank, it must remain one inch—no more and no less—while the wheel is being swept across the bearing. In other words, the distance between the cutting plane of the wheel and the axis of the bearing must remain constant while the axis of the wheel is moved in a plane perpendicular to the axis of the bearing. The means of maintaining this relationship constitutes an important object of this invention.

This object may be accomplished by either of the two specific forms of mechanisms which I have provided, the first of which is shown in Figures 1 to 17 inclusive, and the second being shown in 18 to 21 inclusive. Either of these specific forms may be used in connection with the basic mechanism shown in the other figures. The first form is claimed in my copending application Serial No. 275,092, filed May 22, 1939, and matured as Patent No. 2,240,527, May 6, 1941, of which this present application is a division.

In the first form of the invention, the grinding motor is provided with a main supporting surface or surfaces at the opposite end of the motor from the grinding wheel. This surface or these surfaces are substantially flat. The guide arm is provided with a supporting surface for contact with a support of the grinder supporting surface. The said surface on the guide arm is in the form of a segment of a cylindrical surface, and is arranged concentrically with respect to the center of the crank which is being ground. By this arrangement, the rocking of the grinder on its support does not change the distance between the plane of the cutting surface of the grinding wheel and the axis of the crank. By providing screw adjustment for rocking the grinder, the face of the cup-shaped grinding wheel can be swept across the crank so as to grind an exactly cylindrical surface. It is of course necessary to prevent slipping of the grinder support with respect to the hook, and I therefore provide a projection on one of the contacting surfaces to engage a recess in the other, somewhat in the nature of a one-tooth gear to permit the rocking without permitting the sliding.

It will be understood from the above description of this first form of the invention that the maintenance of the center line of the crank is coincidence with the center line of the rocker surface of the guide arm depends on the diameter of the crank, but in order to provide for the grinding of cranks of different diameter, I provide a sliding adjustment graduated with a scale between the guide arm and the hook so that the operator may know how to set the hook to grind the shaft of a given diameter. It may also be noted that a change in the adjustment of the hook is not necessary for a mere change of a few thousandths of an inch in crank diameter, but that adjustments to provide for changes of ⅛" or more in crank diameter may readily be made.

Another condition encountered in grinders of this type is that the changes of temperature during operation of the grinder cause expansion of the shaft of the grinding wheel. In order to prevent this expansion from interfering with the accuracy of the device and also to prevent the wheel being broken by shock when sharply brought into contact with the crank shaft, I mount the grinding wheel in a thrust bearing closely adjacent the wheel and provide a telescope connection at the other end of the shaft capable of permitting some slight inward movement of the grinding wheel. This movement is normally prevented by a compression spring which is capable of yielding under abnormal pressure supplied to the grinding wheel so as to minimize the danger of breakage as well as to allow for expansion of the shaft during operation.

In order to prevent overspeeding of the grinder when it is moved out of contact with the surface which is to be ground and also to assist in cooling the motor, I provide a fan mounted on the motor shaft. The effect of the fan is merely to create a draft sufficient to cool the motor at the normal grinding speed at which the wheel is intended to be operated. However, when the speed tends to increase by reason of the wheel moving out of contact with the surface which is being ground, the resistance of the fan builds up quite rapidly and prevents excessive overspeeding of the grinding wheel and motor.

During the grinding operation, the shaft becomes more or less covered with grit from the grinding wheel which would rapidly wear away the bearing surface of the hook or bearing guide. In order to prevent this, I have provided special self-adjusting bearing blocks detachably and movably mounted on the bearing guide. These bearing blocks are mounted on a central pivot with four concave surfaces terminating in sharp corners which have the action of scraping the grit off of the bearing, so that it does not get in between the bearing guide and the bearing which is being ground. In this manner, I have substantially prolonged the life of the bearing guides.

It is an object of this invention to provide a generally new and improved device and method of grinding according to the description herein.

The foregoing is accomplished by a construction illustrated in the accompanying drawings forming a part of this specification and wherein like characters of reference designate corresponding parts throughout the several views, in which.

Figure 1:
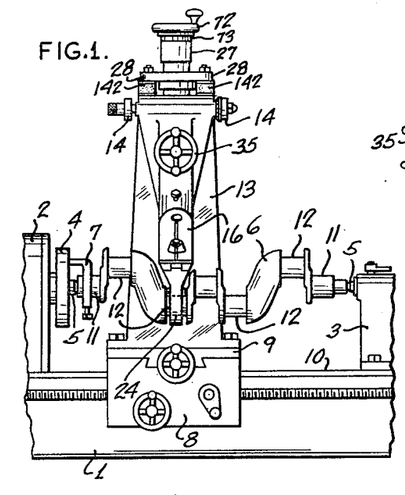
Figure 1 is a diagrammatic front elevation of a crank shaft grinding machine according to my invention with a crank shaft in position to be ground.
Figure 2:
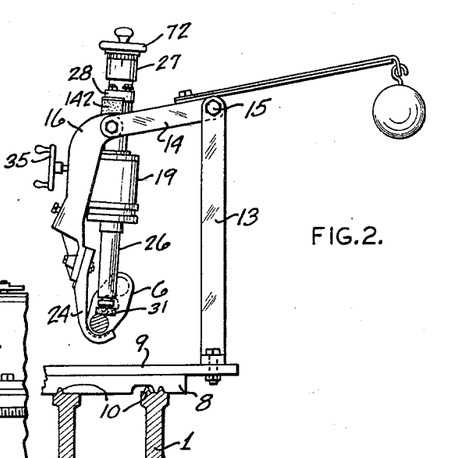
Figure 2 is a diagrammatic end elevation of the same structures as shown in Figure 1.
Figure 3:
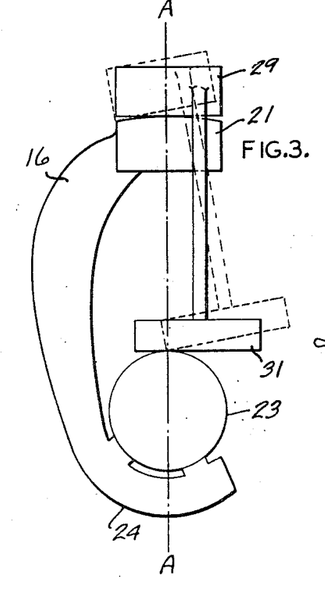
Figure 3 is a geometrical diagram for illustrating one of the principles of operation of the device shown in Figure 1.
Figure 4:
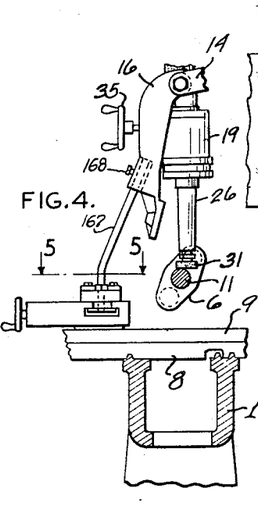
Figure 4 is a diagrammatic end view showing the manner in which the device is used for grinding the main bearing of the crank shaft.
Figure 5:
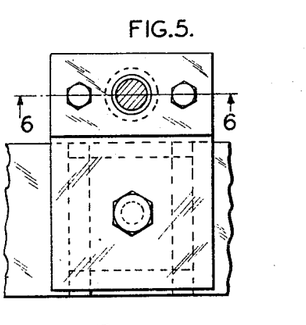
Figure 5 is a detailed plan view showing the means for attaching the guide arm to a relative fixed support as for grinding the main bearings of a crank shaft; the view is taken along the line 5—5 of Figure 4.
Figure 6:
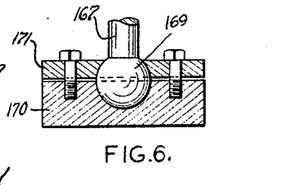
Figure 6 is a detailed sectional view taken along the line 6—6 of Figure 5.

The reference numeral 1 indicates the bed of a device such as a conventional engine lathe having a head stock 2, tail stock 3, face plate 4 and centers 5. When the crank shaft 6 is removed from the engine, it may be placed between the centers of the lathe as indicated in Figure 1 and driven by a conventional lathe dog 7. The lathe is provided with the conventional carriage 8 and cross slide 9. The carriage is movable longitudinally and transversely upon the ways 10 and 10A, respectively, in a manner well known to the art. So much of the structure is conventional in the well known engine lathe.

The conventional crank shaft 6 is provided with centers at its ends, whereby it may be centered up and rotated in the engine lathe. It will be noted that the main bearings 11 are concentric with the centers 5 while the axes of the crank bearings 12 necessarily rotate in a circle and in order to grind the crank bearings while the crank shaft is mounted upon the centers, it is necessary to have a grinder which will follow a crank in its rotation.

I mount a standard 13 upon the carriage 9 or cross side of the lathe. At the upper part of the standard a walking beam 14 is pivoted as upon a counter shaft or centers 15. At the end of the walking beam which overhangs the bed of the lathe, a guide arm 16 is connected to the beam 14 by means of ball bearings 17. Oil holes 18 are provided if desired. A motor frame 19 containing a high speed electric motor is mounted on and carried by the guide arm 16. The construction for supporting the motor frame and mechanism, that is the grinder proper, upon the guide arm, comprises a pair of supporting extensions 20 integral with or rigidly fixed to the guide arm 16. These supports are provided with parallel holes for receiving the plugs 21. The outer ends of the plugs are centrally drilled as at 22 and are ground on a radius such that the supporting surface or outer ends of the plugs 21 will be concentric with the center of a shaft 23 resting in the grinder guide extension 24. The direction of the holes in the supports 20 is such that the axis of the plugs 21 is in line with the center of the shaft which is to be ground. The center line of the plugs 21 passing through the center of the shaft 23 is indicated at A—A in Figure 7.

The motor frame has upper and lower tubular extensions 25 and 26 respectively, the upper extension being slidably mounted and guided in the casing 27 which is provided with shoulders or lugs 28. These shoulders are drilled in line with the center of the plugs 21 to receive hardened plugs 29 having flat surfaces which rest upon and are supported by the cylindrical outer surface of the plugs 21. The plugs 29 are also provided with ball shaped extensions 30 engaging the walls of the bores 22 in the plugs 21 so as to prevent any slippage of the casting 27 and motor frame with respect to the support member 16. By this arrangement, a substantial, but limited, rocking of the grinder upon the guide arm is allowed.

The lugs or shoulders 28 are not in the same plane with the axis frame extensions 25 and 26. The grinder shaft and grinding wheel are concentric with these extensions. The center line of the grinder shaft, when it is in a position parallel to a plane containing the centers of the supports 21, 29 and the center of the shaft 23 is spaced away from said plane by approximately one fourth of the diameter of the average grinding wheel 31 which is intended to be used. This arrangement is for the purpose of giving maximum flexibility of adjustment of the hook member 24 with respect to the guide arm 16.

The diameter of the grinding wheel 31 is preferably of the same length as the diameter of the crank bearing which is to be ground. It is contemplated for instance that the operator would select a two inch wheel for grinding a crank bearing two inches in length and a two and one eighth inch wheel for grinding a bearing two and one eighth inches long. The arrangement of these parts as stated and the cooperation of the plane and curved surfaces of the supporting blocks is more clearly illustrated by the geometrical diagram of Figure 3.

Figure 7:
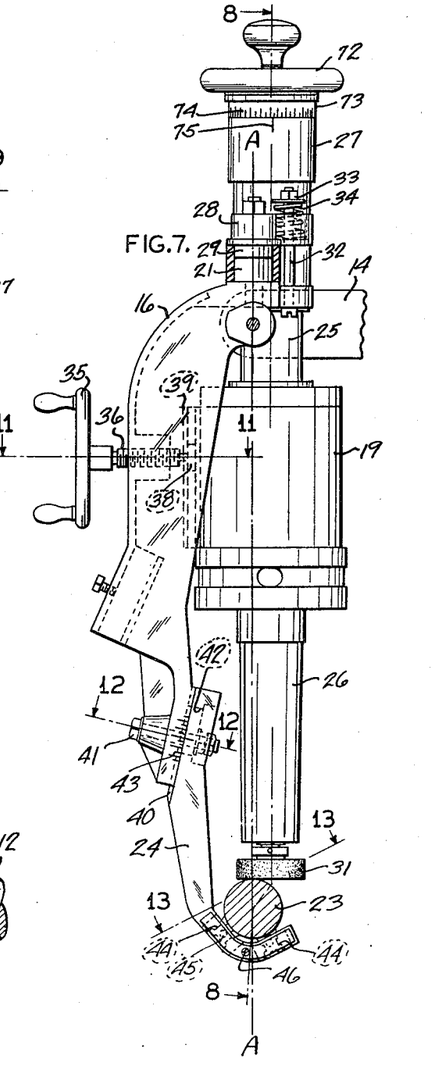
Figure 7 is a side elevation of a crank shaft grinder of the type shown in Figure 1.
Figure 8:
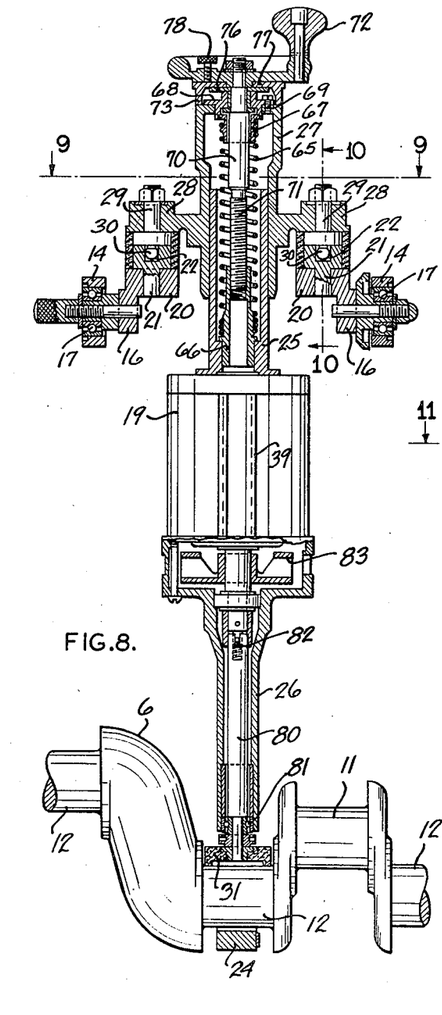
Figure 8 is a sectional view taken along the line 8—8 of Figure 7.
Figures 9, 10, 11, 12, 13, 14, 15:
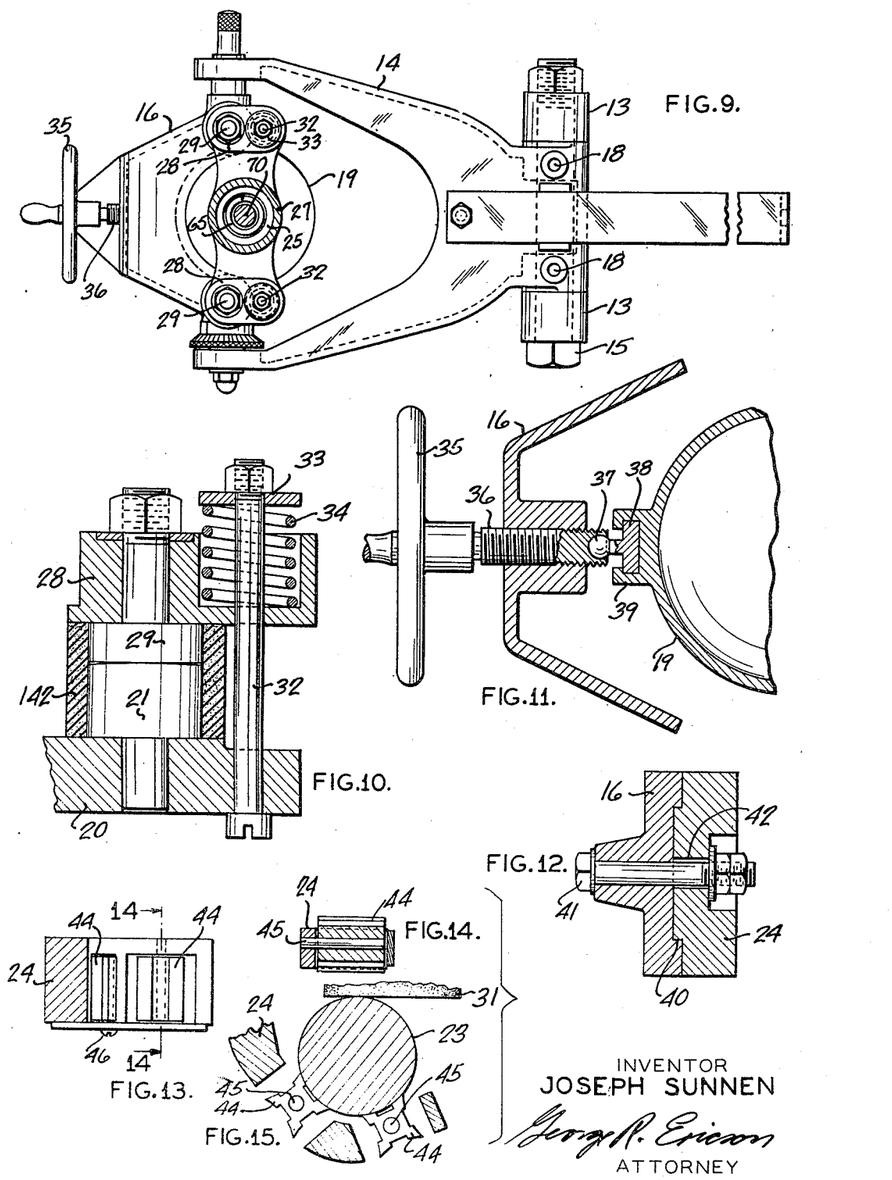
Figure 9 is a plan view taken along the line 9—9 of Figure 8.
Figure 10 is a sectional detailed view taken along the line 10—10 of Figure 8.
Figure 11 is a sectional detailed view taken along the line 11—11 of Figure 7.
Figure 12 is a sectional detailed view taken along the line 12—12 of Figure 7.
Figure 13 is a detailed view taken along the line 13—13 of Figure 7, the crank shaft and the grinding wheel however being omitted.
Figure 14 is a cross section taken along the line 14—14 of Figure 13.
Figure 15 is a diagrammatic illustration of the structure shown in Figures 13 and 14.

In order to maintain the support bearings 29 in contact with the cylindrical surfaces of the supports 21, I provide a pair of bolts 32 passing through the guide arm 16 and the shoulders 28. The bolts 32 are provided with a nut and washer 33 at one end for tightening against the coil spring 34. The strength of the spring 34 is ample to hold the motor firmly in contact against the guide arm but not so strong as to prevent the limited rocking movement of the motor with respect to the guide arm. It will be understood that some play is allowed in the holes for the bolt 32 and in the spring seat for the spring 34 so that no binding action will occur. The normal action of the spring 34 would be the cause of rocking of the motor with respect to the guide arm but this rocking is controlled by the hand wheel 35 and screw 36 which are mounted in the guide arm as shown in Figure 7. The end of the screw 36 is provided with a socket as shown in Figure 11 to receive a ball 37 which is integrally formed with a slide member 38. The motor frame 19 is provided with guide ways 39 for slidably receiving the member 38 which is guided for vertical movement therein. By operating the hand wheel 35 the motor can be rocked so as to sweep the end of the grinding wheel 31 across the surface of the shaft bearing 23. In order to prevent dirt and grit from entering between the surfaces of the members 21 and 29 I preferably surround these members with a piece of rubber hose indicated by the reference numeral 142.

The guide arm 16 is provided with a guide hook or a grinder guide 24 which is slidably and adjustably mounted thereon by means of the ways indicated at 40, Figure 12. A holding bolt 41 mounted in the guide arm 16 and movable in a slot 42 in member 24 provides for angular and longitudinal adjustment of the grinder guide 24 so that if shafts of different diameters are to be ground, the grinder guide can be adjusted to such a position that the center of the shaft which is being ground will be concentric with the cylindrical surfaces of the support members 21. In order to enable the operator to quickly make the desired adjustments a scale 43 may be provided on the adjacent surfaces of the members 16 and 24 with graduations indicating the diameter of the bearing corresponding to the adjustment of the two members.

The grinder guide 24 is provided with replaceable wear blocks 44 which are pivotally mounted on the pins 45. These wear blocks are formed with four intersecting concave surfaces, the radius of the concave surface being smaller than the radius of the smallest bearing which is likely to be ground. This arrangement provides for practically a scraping contact between the wear blocks and the bearing which is being ground so as to scrape off dirt from the stone during the rotation of the shaft. The wear blocks can be turned in their mounted position or completely removed and replaced by removing the plate which is held in position by one or more screws 46.

The tubular extension 25 of the motor casing, which is slidably mounted in the bore of the cast casing 27, contains a tension spring 65 which is rigidly attached to a tubular plug 66 rigidly mounted in the lower end of extension 25 adjacent the motor. The plug 66 is of tubular form and is internally threaded. The other end of the spring 65 is rigidly connected to the bearing member 67 mounted in the sleeve 68 arranged at the upper end of the cast casing 27. The sleeve 68 includes an upper flange which rests upon the upper portion of the cast casing 27, the latter being formed with an inturned flange portion for this purpose. A bolt 69 extends through the flange of the sleeve 68 and the upper inturned flange portion of the cast casing and secures these parts together. Rotatably mounted in the tubular extension 25 and the bore of the cast casing 27 is a shaft 70 provided with screw threads 71 which engage the threads of the plug 66. A hand wheel 72 is fixedly mounted on the shaft 70, and this hand wheel includes the collar 73 provided with graduations 74 in registration with the gauge mark 75 on tubular casing 27. A washer plate 76 is interposed between the upper face of the sleeve 68 and the inturned flange 77 of the collar 73 to complete the assembly. The scale 74 is graduated in such a manner as to read in thousandths of an inch of adjustment of the motor 19 and grinding wheel 31, and in order to maintain this adjustment of the grinding wheel, a set screw 78 is provided to bind against the upper part of the collar flange 77. Thus it will be seen that a minute adjustment of the grinding wheel can be readily accomplished and maintained.

The grinding wheel 31 is driven by means of the shaft 80 rotatably mounted in the lower casing extension 26 and a thrust bearing 81 is provided on the lower end of the shaft 80 closely adjacent the wheel 31 which latter, together with the telescopic connection 82 at the upper end of this shaft 80 permits a slight inward movement of the wheel 31 and thus eliminates the possibility of fracture by shock from sudden contact with the surface to be ground. The provision of the slip joint 82 also permits essential movement of the shaft due to changes in temperature which may occur during grinding operation.

To further safeguard the assembly, the motor structure includes the fan element 83 fixed to the motor shaft, within the motor casing or adjacent thereto, whereby during normal grinding operations the motor may be kept properly cooled by the blasts therefrom. In instances when the grinder is operating and the grinding wheel is moved out of contact with the bearing surface the grinder speed is essentially accelerated and in such instances the fan, because of its structure, tends to retard the racing of the operating parts due to resistance which is rapidly built up as the fan speed is increased.

Figure 16:
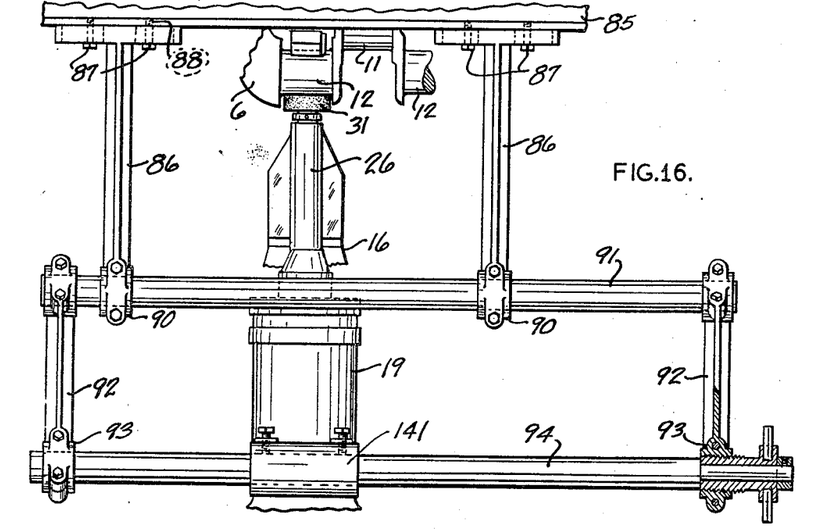
Figure 16 is the side elevation of the device used according to my invention for grinding the crank of a crank shaft without disassembling it from the engine.
Figure 17:
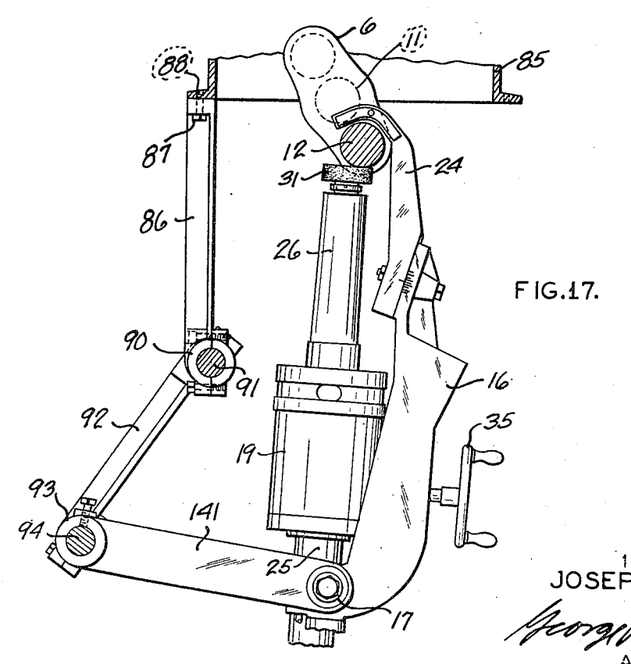
Figure 17 is a cross sectional elevation of the device shown in Figure 16.

In the construction shown in Figs. 16 and 17 the grinding operation may be performed without removing the crank shaft from the motor. The crank case of the engine is diagrammatically indicated with reference numeral 85. The crank shaft 6 remains mounted in the crank bearings 11 but the connecting rods are removed from the crank bearings 12. The lower half of the crank case having been removed a pair of bracket members 86 are attached to the upper crank case 85 or engine base by means of screws 87 in holes 88. It will be understood that the holes 88 are normally provided in the engine for reception of the bolts which hold the lower half of the crank case in position. The hangers 86 are provided with bearings 90 at their lower ends to receive the countershaft 91 which is rotatable and slidable in the bearings 90. Connecting rods or frame members 92 are rigidly connected to the countershaft 91 in parallelism with each other and these members 92 are provided at their free ends with mountings 93 to receive the guide shaft 94. It will be noted that the holes 88 in the conventional engine construction are formed in line parallel with the axis of the crank shaft and that the shafts 91 and 94 will for that reason be maintained in parallelism therewith. The grinder construction 31, hook 24 and guide arm 16 in Figures 16 and 17 are identical with the corresponding members in the other figures. The member 14 and counterweight, however, are replaced by a similar, though perhaps not identical member 141 which is pivotally mounted at one end on the shaft 94 while the other end is mounted on the bearings 17. In this arrangement the grinder proper is suspended from the crank shaft and crank bearing 12 by means of the hook or grinder guide 24 so that there is no need of a counterweight to hold the same in contact with the crank bearing.

In operation, the crank shaft is rotated in any suitable manner, preferably by mounting one or both rear wheels of the automobile on a motor driven drum, putting the car in high gear and thereby rotating the crank shaft. The crank shaft could, of course, be rotated with the usual starting motor, although it would be desirable to provide a separate source of current to prevent undue strain on the storage battery. While the crank shaft is being rotated in this manner, the grinding wheel 31 is gradually fed up against the crank bearing 12 by means of the hand wheel 71. The operator also sweeps the wheel back and forth across the bearing by means of the hand wheel 35. In the present modification, the grinder is oscillated on a pivot, the axis of which extends in a plane parallel to the axis of the grinder and in this manner the grinder may be swung across the bearing at such a tangent as the arrangement of the parts may provide.

With respect to the device shown in Figures 18, 19, 20 and 21, I utilize a different principle of operation for maintaining the cylindrical shape of the bearings which are to be ground. Instead of mounting the grinder on a rocking support, I mount it on a pivot having an axis perpendicular to a plane containing the center of the bearing which is to be ground. The axis of the pivot is parallel but not concentric with the axis of the grinder shaft, so that by swinging the grinder on the pivot, the grinding wheel may be swept across the bearing surface while maintaining the face of the grinder wheel in the same place.

The mounting of this modified form for grinding operation is illustrated as corresponding to the previous structure and utilizes the standard 13 at the upper part of which is pivoted the walking beam 14, by means of a countershaft or centers 15. The ends of the walking beam 14 are mounted on the opposite end portions of the horizontal pivot pin or rod 100, and are secured thereon by nuts 101 in threaded engagement therewith, threads being formed on the extremities of the pivot pin 100 for this purpose.

The guide arm 16 of the present form differs materially in structure from guide arm of the preferred form in that it includes a hub portion 102 which is mounted on the horizontal pivot pin 100 and is interposed between the extremities of the walking beam 14 thereby providing a neat and compact assembly of these parts. The hub 102 of the guide arm 16 is formed with a fixed vertically extending tubular body or pintle 103, slightly enlarged in diameter near its lower extremity to provide an annular shoulder 104, and the enlarged portion 105 defined by the shoulder 104 is extended inwardly forming an offset lower projection 106, the upper face 107 of which extends in a common plane with the shoulder 104 and is in fact a continuation thereof.

The upper face 107 of the offset portion 106 is drilled vertically at a point in common plane with and interposed between the vertical axis of the tubular extension 103 and the normal centered position of the vertical axis of the grinder 108, indicated by reference character 109, to provide a socket for the pin 110. The passage through the vertical tubular member 103 is restricted by the thickened wall portion 111 and this restricted passage is threaded throughout its length to receive an adjusting pin 112 carried by the tubular motor casing extension on pintle retainer 114 which is secured to and spaced from the motor casing 115 by connections including a web structure comprising spaced walls 116 and 117. The wall 116 is formed with a reenforced portion 118 having central threaded opening 119 for the reception of the threaded shank 120 of the adjusting screw, the inner end of which engages the adjacent face of the pin 110, and the outer end is provided with the handle member 122 of suitable design. The wall 117 includes an intermediate portion parallel to that wall portion of wall 116 formed with the threaded opening 119 and this parallel wall portion of wall 117 is provided with a fixed socket or cup 123 containing a coiled spring 124 and plunger 125, the latter engaging at its outer end the pin 110 at a point diametrically opposed to that part of the pin engaged by the adjusting screw 121. Each of the walls 116 and 117 includes flared outer end portions 126 which are shaped to snugly engage the motor casing 115 and be secured thereto by bolts 127. Horizontal webs 128 and 129 connect the upper and lower marginal edges of the walls 116 and 117 and lend the essential rigidity to the assembly.

The upper end of the pintle retainer 114 is flanged at 130 to provide a supporting surface for the cap 131, which is fixed thereto by screws 132, and on this cap is seated the collar 133 and the hand wheel 134. The cap 131, collar 133 and hand wheel 134 are formed with central axially aligned bores through which the upper end of the adjusting pin 112 extends. This pin 112 is provided with a shoulder or fixed collar 135 which abuts against the under face of the cap 131 and at a point intermediate the collar 135 and its upper extremity, it is reduced in diameter to form a shoulder 136 which engages the under face of the collar 133. It will be noted that the bore through the collar 133 and hand wheel 134 is reduced to accommodate the reduction in the diameter of the adjusting pin 112 and that a nut 136 is threaded on the end of the pin 112 to function with the lock washer 137 to secure the wheel 134 and collar 133 fixedly together. The collar 133 is formed with an annular seat 138 in its under face and concentrically of its bore to receive the thrust bearing assembly 139 which latter facilitates the movement of these parts to provide accurate adjustment in accordance with scale markings 140 formed on the adjacent outer faces of the collar 133 and cap 131.

Arranged on the pintle 103, and interposed between the shoulder 104 thereof and the lower edge of the retainer 114 is a coiled spring 141 which cooperates with the parts in facilitating the essential accurate adjustments through movement of the hand wheel 130. This spring also provides the necessary resiliency for operating the structure without injury to the parts.

From the foregoing, it will be obvious that while the application of the structure to a bearing for grinding is essentially the same, either when the crank shaft is in situ or disassembled, nevertheless the operation involved in the actual grinding differs materially in many respects. In the first instance, the motor and grinding wheel assembly includes a casing to which is secured a tubular body 114 which constitutes a pintle retainer, in that it receives the tubular pintle 103 fixed to the hub 102 of the guide arm 16. The hinge thus formed by the pintle 103 and the retainer 114 permits a swinging movement of the motor and grinder assembly, and this movement is subject to control or regulation by means of the adjusting pin 112 and the adjusting screw 121. When the guide arm 16 and the grinder guide extension 24 have been adjusted in accordance with the requirements of the crank shaft dimensions by utilization of the graduated joint 43, conventional to all forms of the device, whereby the grinder guide 24 is properly engaged to position the grinding wheel, the hand wheel 134 can be actuated to shift the motor and grinder to the essential degree for proper working engagement. As the operation progresses, the hand wheel 122 can be manipulated to swing the motor on its hinged mounting by virtue of the coacting spring pressed plunger 125 and the threaded adjusting screw 121, which engage opposed sides of the pin 110 and control the swinging movement of the grinder wheel across the bearing surface. The movement of the grinding wheel axis, due to the hinge structure and the guide means for the assembly, is in a plane perpendicular to the axis to be ground.

Figures 18, 19, 22, 23:
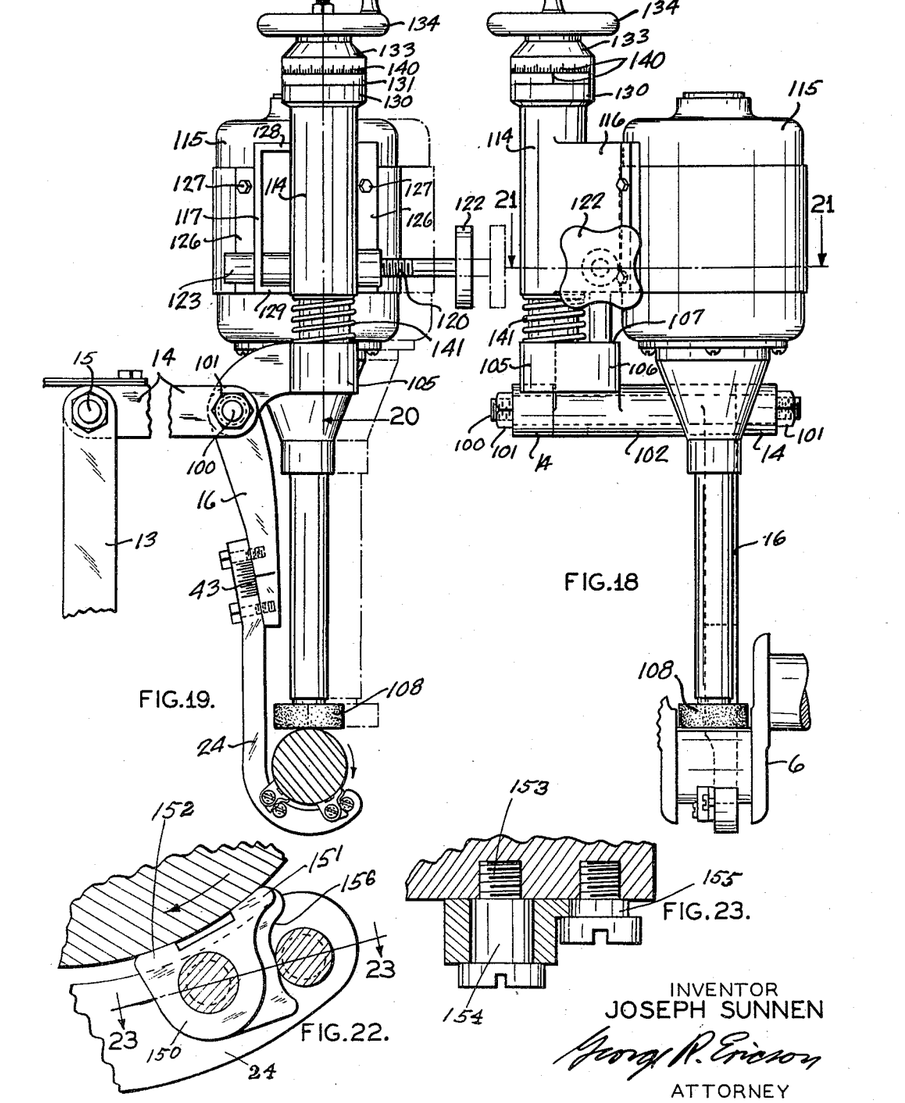
Figure 18 is a side elevation of a modified form of my invention.
Figure 19 is a front elevation of the modification of Figure 18.
Figure 22 is a detail view showing a modified form of bearing block, a portion of the hook 24 and crank shaft being shown.
Figure 23 is a detail view taken along the line 23—23 of Figure 22.
Figures 20, 21:
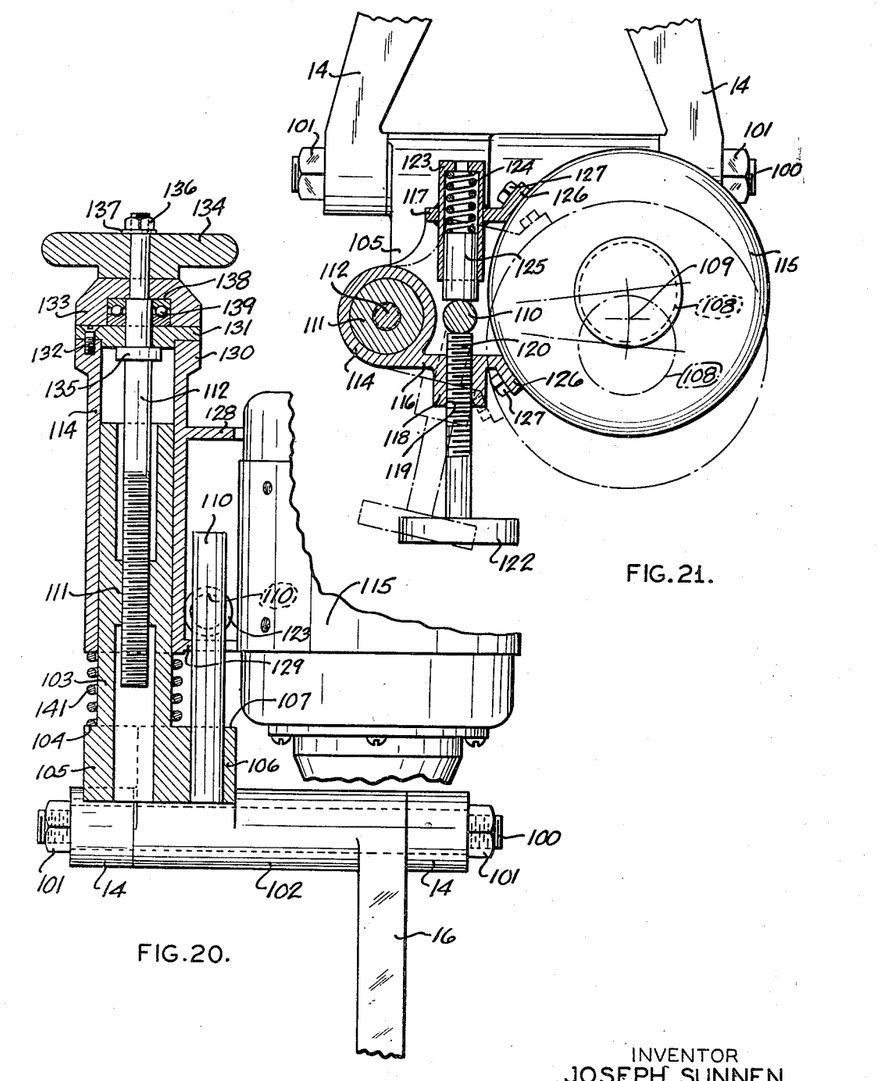
Figure 20 is a sectional detail on line 20—20 of Figure 19.
Figure 21 is a cross section on line 21—21 of Figure 18.

In Figures 22 and 23, I show a modified form of guide block or support for the bearing which is being ground. In this form, the guide blocks 150 are provided with a leading edge 151 having greater length than the trailing edge 152 so as to centralize the wear. These guide blocks are rotatably mounted on the screw 153 which is provided with the bearing surface 154 for that purpose. A second screw 155 is mounted adjacent the screw 153 to engage the yoke 156 which is formed integral with the bearing block. It will be noted that this arrangement provides a limited rocking movement of the bearing block on the screw 153, but does not allow the bearing block to swing clear around. The purpose of this arrangement is to insure the bearing block seating properly on the shaft which is to be ground without any attention from the operator.

The foregoing invention in its numerous applications and modifications is essentially subject to changes in details of construction and arrangement of parts which will not affect the nature and scope of the invention.

I claim:

1. In a crankshaft grinder, a frame, a guide arm attached to said frame, a hook adapted to engage the bearing which is to be ground and connected to said guide arm, a motor pivotally mounted on said frame, a grinding wheel driven by said motor and movable therewith about said pivot, said grinding wheel having a cutting surface lying in a plane parallel to a generating element of the surface which is to be ground, the axis of said pivot being substantially perpendicular to said generating element.

2. In a crankshaft grinder, a support, a frame connected to said support by pivot means having an axis parallel to the axis of the crank shaft which is to be ground, a hook connected to said frame and adapted to support said frame by engagement with the surface which is to be ground, a grinding wheel pivotally mounted on said frame, the pivot of said grinding wheel being substantially perpendicular to the axis of the crank shaft, and means for swinging said wheel about said pivot during rotation of the grinding wheel and of said crank shaft.

3. In a crank shaft grinder, a support, a frame connected to said support by pivot means having an axis perpendicular to the axis of the crank shaft which is to be ground, a cup-shaped grinding wheel supported by said frame and having an axis substantially parallel to the axis of the pivot means, and means for swinging said frame and wheel about said pivot during rotation of said wheel and shaft so as to cause the axis of said wheel to intersect the axis of the surface which is being ground, and to cause said wheel to be swept across the surface which is being ground.

4. In a crank shaft grinder, a support member, a grinder frame, said support member being parallel to the axis of the crank shaft which is to be ground, said grinder frame being connected to said support member by pivoted linkage, said linkage having the axes of its pivots parallel to the axis of the crank shaft which is to be ground, said frame having a hook constructed and arranged to support said frame from the surface which is to be ground, whereby said frame may follow the motion of a crank bearing of said shaft during its rotation, a cup grinding wheel carried by said frame, said wheel being mounted on said frame by means of a pivot having an axis substantially perpendicular to the axis of the crank shaft.

5. In a crank shaft grinder, a frame, a grinder, a pivot bearing forming a connection and support between said frame and said grinder, said grinder having a grinding surface adapted to be moved into contact with the work in a plane parallel with the axis of said bearing, spring means between said frame and said grinder biasing said grinder in the direction of the work.

6. In a crankshaft grinder, a frame, a grinder, a pivot bearing forming a connection and support between said frame and said grinder, said grinder having a grinding surface adapted to be moved into contact with the work in a plane parallel with the axis of said bearing, spring means between said frame and said grinder biasing said grinder in the direction of the work, and a screw threaded adjusting means for limiting the travel of said grinder toward the work under the influence of said spring.

7. In a crankshaft grinder, a frame, a grinder, a pivot bearing forming a connection and support between said frame and said grinder, said grinder having a grinding surface adapted to be moved into contact with the work in a direction parallel with the axis of said bearing, spring means between said frame and said grinder biasing said grinder in the direction of the work, a second spring device tending to rotate said grinder about said pivot, and adjusting means for controlling the amount of said rotation under the influence of said last named spring.

8. In a crankshaft grinder, a support parallel with the axis of the crankshaft which is to be ground, a grinder frame, pivoted linkage connecting said support and said frame, a hook connected to said frame and constructed and arranged to support said frame from the surface which is to be ground, a grinder pivotally mounted on said frame, said grinder having a cutting surface lying in a plane parallel to the surface which is to be ground, the pivot mounting of said grinder being perpendicular to said plane.

9. In a crank shaft grinder, a support parallel with the axis of the crank shaft which is to be ground, a grinder frame, pivoted linkage connecting said support and said frame, a hook connected to said frame and constructed and arranged to support said frame from the surface which is to be ground, a grinder pivotally mounted on said frame, said grinder having a cutting surface lying in a plane parallel to the surface which is to be ground, the pivot mounting of said grinder being perpendicular to said plane, and means for swinging said grinder about said pivot, whereby said cutting surface may be swept across the surface which is to be ground.

10. A crank shaft grinder comprising a frame, a guide arm connected to said frame, a grinder motor and grinding wheel carried by said frame, said guide arm having a pair of spaced pivot members having axes parallel to the axis of the surface which is to be ground, and means for moving the axis of said wheel transversely with respect to the axes of said pivot members, and means for moving said wheel along its axis toward said members.

11. A crank shaft grinder comprising a frame, a guide arm connected to said frame, a grinder motor and grinding wheel carried by said frame, said guide arm having a pair of spaced pivot members having axes parallel to the axis of the surface which is to be ground, resilient means biasing said wheel in a direction parallel to its axis toward said pivot members, and adjustable means for limiting such movement of the wheel toward said members.

12. In a crank shaft grinder, a guide arm comprising a hook, a pair of pivots mounted on said hook, and bearing shoes mounted on said pivots, said bearing shoes having a concave surface adapted to receive the cylindrical surface of the shaft which is to be ground in mutual guiding relation, and a grinder motor and grinding wheel connected to said guide arm and adapted to be positioned with respect to said cylindrical surface by contact of said bearing shoes therewith.

13. In a crank shaft grinder, a guide arm comprising a hook, a pair of pivots mounted on said hook, and bearing shoes mounted on said pivots, said bearing shoes having concave surfaces adapted to rest on the surface which is to be ground, a grinder motor and grinding wheel connected to said guide arm, said motor and wheel being adapted to be positioned with respect to said surface by contact of said bearing shoes therewith.

14. In a crank shaft grinder, a guide arm comprising a hook, a pair of pivots mounted on said hook, and bearing shoes mounted on said pivots, said bearing shoes having concave surfaces adapted to rest on the surface which is to be ground, said concave surfaces terminating in sharp edges capable of scraping loose grit off the surface which is to be ground, a grinder motor and grinding wheel connected to said guide arm, said motor and wheel being adapted to be positioned with respect to said surface by contact of said bearing shoes therewith.

15. In a crank shaft grinder, a guide arm, a bearing shoe comprising a member having a longitudinally extending pivot receiving opening, a concave bearing surface parallel to the axis of said opening, said bearing surface terminating in a sharp edge which is capable of scraping loose grit off the surface which is to be ground, a grinder motor and grinding wheel connected to said guide arm, said motor and wheel being adapted to be positioned with respect to said surface by contact of said bearing shoes therewith.

16. In a crank shaft grinder, a guide arm, a bearing shoe comprising a member having a longitudinally extending pivot opening therein, the exterior of said member being formed with a plurality of concave bearing surfaces, said surfaces intersecting in a sharp edge, a grinder motor and grinding wheel connected to said guide arm, said motor and wheel being adapted to be positioned with respect to said surface by contact of said bearing shoes therewith.

JOSEPH SUNNEN.